(12) United States Patent
Hong

(10) Patent No.: US 9,057,648 B2
(45) Date of Patent: Jun. 16, 2015

(54) THERMOSTATIC ELEMENT

(75) Inventor: Chuwan Hong, Taichung (TW)

(73) Assignee: Globe Union Industrial Corp., Taichung (TW)

(*) Notice: Subject to any disclaimer, the term of this patent is extended or adjusted under 35 U.S.C. 154(b) by 360 days.

(21) Appl. No.: 13/607,926

(22) Filed: Sep. 10, 2012

(65) Prior Publication Data

US 2013/0075485 A1    Mar. 28, 2013

(30) Foreign Application Priority Data

Sep. 22, 2011    (TW) .............................. 100134084 A

(51) Int. Cl.
*G01K 5/44*    (2006.01)
*F03G 7/06*    (2006.01)

(52) U.S. Cl.
CPC ..... *G01K 5/44* (2013.01); *F03G 7/06* (2013.01)

(58) Field of Classification Search
CPC .... G05D 23/02; G05D 23/021; G05D 23/022; G05D 23/024; G05D 23/025
USPC ................. 236/93 A, 99 R, 100, 99 K, 99 J
See application file for complete search history.

(56) References Cited

U.S. PATENT DOCUMENTS

| | | | | |
|---|---|---|---|---|
| 6,118,656 A * | 9/2000 | Wang | ..................... | 361/679.54 |
| 6,378,776 B1 * | 4/2002 | Chamot et al. | ................ | 236/100 |
| 6,817,540 B2 * | 11/2004 | Suda et al. | .................... | 236/99 K |
| 8,167,217 B2 * | 5/2012 | Lhuillier | ...................... | 236/100 |
| 2007/0277965 A1 * | 12/2007 | Manasek | ....................... | 165/177 |
| 2008/0156890 A1 * | 7/2008 | Le Clanche et al. | ...... | 236/101 R |
| 2009/0272816 A1 * | 11/2009 | Lhuillier | .................... | 236/12.11 |

FOREIGN PATENT DOCUMENTS

EP    153555 A1 *    9/1985

* cited by examiner

*Primary Examiner* — Frantz Jules
*Assistant Examiner* — Nelson Nieves
(74) *Attorney, Agent, or Firm* — Alan D. Kamrath; Kamrath IP Lawfirm, P.A.

(57) ABSTRACT

A thermostatic element contains: a metal cover, a sleeve, a filler, a partition disc, and a piston. The metal cover has a covering head, at least two tubular legs, and a connecting portion between the covering head and the at least two tubular legs. The sleeve has a central channel and a seat, and the filler is filled in the metal cover. The partition disc is applied for separating the sleeve from the filler, and the piston is fixed in the central channel and couples with the filler by using the partition disc. Furthermore, each tubular leg has a cavity, and the connecting portion has a common room communicating with the cavity of each tubular leg, such that the filler is filled in each cavity and the common room. Furthermore, between the at least two tubular legs is defined at least one passage for flowing fluid.

13 Claims, 7 Drawing Sheets

THERMOSTATIC ELEMENT

FIELD OF THE INVENTION

The present invention relates to a thermostatic element.

BACKGROUND OF THE INVENTION

A conventional thermostatic element expands and retracts with a temperature change of fluid, such as water, and it is applied in a thermostatic controlling device or a thermostatic control valve of shower equipment so that a water supply is controlled at a set temperature.

As shown in FIGS. 1 and 2, another conventional thermostatic element disclosed in CN Publication No. 101084477A contains a metal cover 1, a sleeve 2, a filler 3 expanding and contracting, a partition disc 4, a piston 5, a wind box 6, a pad 7, and a washer 8. The metal cover 1 further includes a tubular portion 11, a bottom end 12 for closing the tubular portion 11, and a loop 13 extending outwardly from another end of the tubular portion 11. The sleeve 2 includes a central channel 21 and a seat 22 fixed in the loop 13. The filler 3 is paraffin wax filled in the tubular portion 11 of the metal cover 1 and expands and contracts with a temperature change. The partition disc 4 is disposed between the seat 22 of the sleeve 2 and the tubular portion 11 to separate the seat 22 from the filler 3. The piston 5 is mounted in the central channel 21 of the sleeve 2 and is driven by a central area of the partition disc 4, The piston 5 has one end opposite to the partition disc 4 and another end extends out of the sleeve 2 based on the temperature change and a volume change of the filler 3. The wind box 6 is driven by the piston 5 to move without deformation. The central area of the partition disc 4 drives the piston 5 via the pad 7 and the washer 8 so that the piston 5 moves along an axial line X-X of the conventional thermostatic element. The pad 7 is made of a flexible deformable elastomer and contacts with the partition disc 4. The pad 8 is located between the piston and the pad 7 and is made of polymer, such as Teflon (PTFE), so as to prevent the pad 7 from bending around the piston 5.

The filler 3 of the conventional thermostatic element is made of paraffin wax so as to drive the piston 5 to move, but a thermal conductivity coefficient of the paraffin wax is low (around 0.25 W/m·k), so when the metal cover 1 soaks in a fluid, such as water, a reaction delay happens without reacting the temperature change. To improve such a problem, heat conductive powders, such as copper powders (around 400 W/m·k), are added into the paraffin wax. However, a heterogeneous mixture of the paraffin wax and the metal powders has a physical difference, and uniformity of the heterogeneous mixture affects the performance of the thermostatic element so the paraffin wax and the metal powders have to be mixed evenly. In case the paraffin wax and the metal powders are mixed unevenly, respective thermostatic elements have different performances.

In addition, a density of the paraffin wax is about 0.8 g/cm$^3$ greatly different from that of metal powders (for example, a density of the cooper powders is 8.94 g/cm$^3$). Accordingly, in operation, a separated deposition of the copper powders occurs, and heat conductions and expansions and contractions of an upper end and the lower end of the filler in the metal cover are different, thus reducing service life of the conventional thermostatic element.

To overcome above-mentioned problem, the conventional thermostatic element, as illustrated in FIGS. 3 and 4, has an improved metal cover 1. The metal cover 1 has at least two cavities 14 (i.e., four cavities 14) to fill the filler 3, and the four cavities 14 connect with each other and the metal cover 1 so that external fluid or a temperature change of the water conducts heat toward the filler 3 in the four cavities 14 through the metal cover 1. Taking the filler 3 at a fixed volume and the metal cover 1 at a fixed length for example, a contacting area of the filler 3 and the four cavities 14 is increased, and a largest distance between any two particles of the paraffin wax is lowered so as to enhance heat conducting efficiency and to reduce reaction time of the thermostatic element.

Nevertheless, the four cavities 14 of the metal cover 1 can not contact with the external fluid directly, so the heat conducting efficiency is not improved greatly.

The present invention has arisen to mitigate and/or obviate the afore-described disadvantages.

SUMMARY OF THE INVENTION

The primary object of the present invention is to provide a thermostatic element which is capable of overcoming the shortcomings of the conventional thermostatic element.

To obtain the above objectives, a thermostatic element in accordance with the present invention contains:

a metal cover for soaking in a fluid and having a covering head defined on a top end thereof;

a sleeve having a central channel and a seat located at a bottom end thereof; the seat being fixed in the covering head of the metal cover;

a filler filled in the metal cover and expanding and contracting based on a mixed temperature of cold water and hot water;

a partition disc disposed between the sleeve and the metal cover so as to separate the sleeve from the filler;

a piston secured in the central channel of the sleeve and coupling with the filler by ways of a central area of the partition disc, such that when the filler expands thermally or contracts, and the piston is driven by the central area of the partition disc to move in the central channel of the sleeve;

characterized in that:

the metal cover further has at least two tubular leg axially extending outward therefrom and a connecting portion defined between the covering head and the at least two tubular legs; each tubular leg has a cavity formed therein, and the connecting portion has a common room communicating with at least two cavities of the at least two tubular legs, such that the filler is filled in the at least two cavities and the common room; between the at least two tubular legs is defined at least one passage for flowing the fluid.

It is to be noted that the thermostatic element of the present invention not only enables an external fluid to flow through an outer surface of the metal cover, but also allows an external fluid to flow along the passage of the two tubular legs so as to obtain the following advantages:

1. The conventional thermostatic element has a filler and a metal covers, both of which are at the same volume and length. Yet the metal cover of the present invention has a larger contact surface for contacting with the fluid directly so as to enhance heat conducting efficiency, such that a reaction time of the piston is shorten, i.e., a reaction time of the thermostatic element of the present invention is reduced. By an experiment, the heat conducting efficiency of the thermostatic element of the present invention is enhanced 2 to 2.7 times more than that of a conventional thermostatic element. Likewise, the heat conducting efficiency of the thermostatic element of the present invention is enhanced 1.3 to 1.5 times more than that of another conventional thermostatic element.

2. A largest distance between the two cavities and a largest distance between any two particles of the filler (such as paraffin wax) are reduced effectively or are maintained at a smaller value so as to enhance the heat conducting efficiency and to lower the reaction time of the thermostatic element of the present invention.
3. Since the heat conducting efficiency of the thermostatic element of the present invention is increased greatly, the filler is fully selected from the thermal expansion material (such as paraffin wax) without adding any heat conduction material (such as copper powders) so as to lower material cost. In addition, performance differences of the conventional thermostatic elements are overcome after an uneven mixture occurs in a mixing process of the paraffin wax and copper powders, and a separated deposition of the copper powders is avoided, thus prolonging the service life of the thermostatic element of the present invention.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
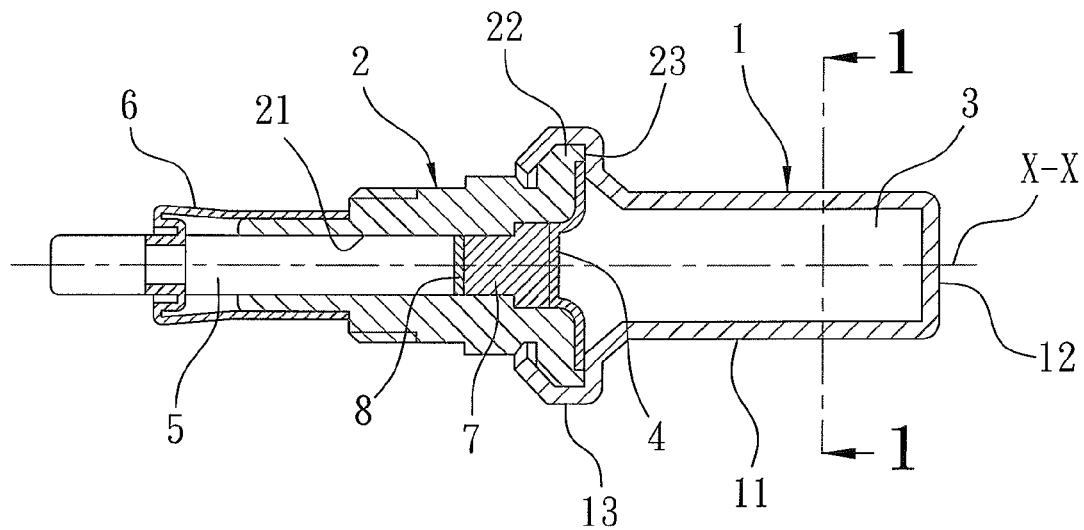
FIG. 1 is a cross sectional view of a conventional thermostatic element.

With reference to FIGS. 5-8, a thermostatic element according to a first embodiment of the present invention is installed in a thermostatic controlling device or a thermostatic control valve of shower equipment and comprises some components the same as those of a conventional thermostatic element as follows:

a metal cover 30 for soaking in a fluid, such as water, and the metal cover 30 having a covering head 31 defined on a top end thereof;

a sleeve 40 having a central channel 41 and a seat 42 located at a bottom end thereof; wherein the seat 42 is fixed in the covering head 31 of the metal cover 30;

a filler 50 filled in the metal cover 30 and expanding and contracting based on a mixed temperature of cold water and hot water, in this embodiment, the filler 50 is a thermal expansion material, such as paraffin wax, or the filler 50 is a mixture of the thermal expansion material and thermal conduction powders, such as copper powders;

a partition disc 60 disposed between the sleeve 40 and the metal cover 30 so as to separate the sleeve 40 from the filler 50;

a piston 70 secured in the central channel 41 of the sleeve 40 and coupling with the filler 50 by ways of a central area of the partition disc 60, such that when the filler 50 expands thermally or contracts, the piston 70 is driven by the central area of the partition disc 60 to move in the central channel 41 of the sleeve 40 along an axial line X-X of the thermostatic element of the present invention;

a pad 80 fixed in a section of the central channel 41 between the piston 70 and the partition disc 60 so that the central area of the partition disc 60 drives the piston 70 via the pad 80, wherein the pad 80 is made of a deformable elastomer.

An improvement of the thermostatic element of the present invention comprises:

the metal cover 30 further having two tubular legs 32 axially extending outward therefrom and a connecting portion 33 defined between the covering head 31 and the two tubular legs 32; wherein each tubular leg 32 has a cavity 321 formed therein, and the connecting portion 33 has a common room 331 communicating with two cavities 321 of the two tubular legs 32, such that the filler 50 is filled in the two cavities 321 and the common room 331. Between the two tubular legs 32 is defined a passage 322 for flowing the fluid.

In this embodiment, the two tubular legs 32 of the metal cover 30 are symmetrical to each other and have two cross sections formed in a half-moon shape, and a width of the passage 322 between the two tubular legs 32 is fixed.

The thermostatic element of the present invention is used to sense an external fluid medium, such as the mixed temperature of the cold water and the hot water, and the metal cover 30 and the filler 50 are applied to conduct heat. For example, after the thermostatic element of the present invention is connected with a conventional thermostatic controlling device or a conventional thermostatic control valve, when the mixed temperature of the cold water and the hot water increases, the filler 50 expands because of heat conduction, and the piston 70 is driven by the partition disc 60 and the pad 80 to extend outwardly so as to further drive a valve block, hence a first inlet for flowing the hot water is reduced and a second inlet for flowing the cold water is increased, such that a mixed ratio of the hot water and the cold water is lowered so as to decrease the mixed temperature. In contrast, when the mixed temperature reduces, the filler 50 contracts because of the heat conduction, and the pad 80 and the piston 70 are driven by the partition disc 60 and a return spring for matching with the partition disc 60 to retract inwardly, such that the valve block is driven by the pad 80 and the piston 70, hence the first inlet for flowing the hot water is increased and the second inlet for flowing the cold water is reduced, such that the mixed ratio of the hot water and the cold water is raised to increase the mixed temperature. Thereby, the mixed temperature of the hot water and the cold water is maintained at a constant value. Because above-mentioned operation and technique are well-known, only a brief description is shown herein.

Figure 2:
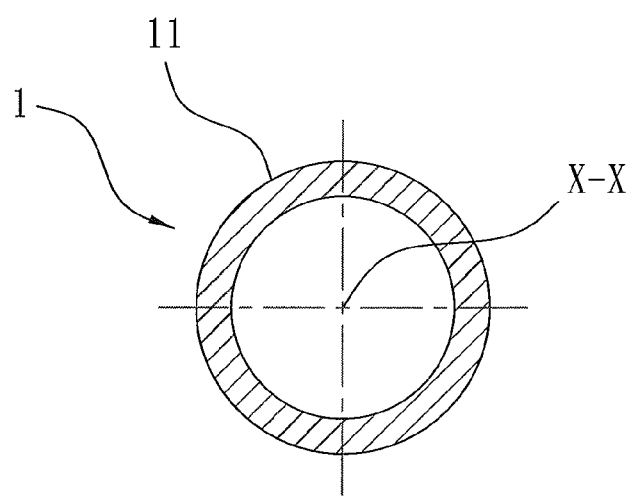
FIG. 2 is a cross sectional view taken along the lines 1-1 of FIG. 1.
Figure 3:
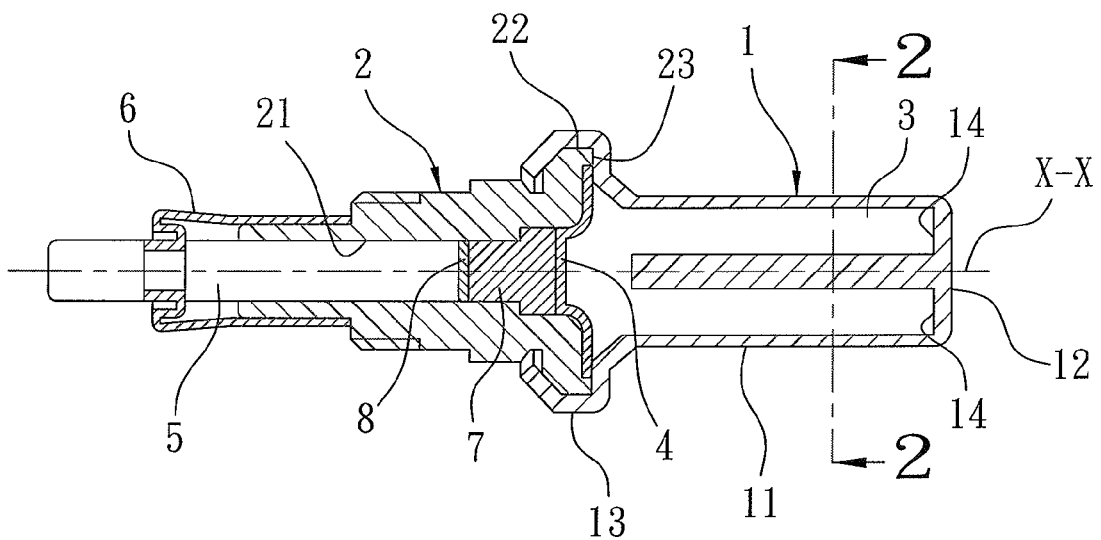
FIG. 3 is another cross sectional view of the conventional thermostatic element.
Figure 4:
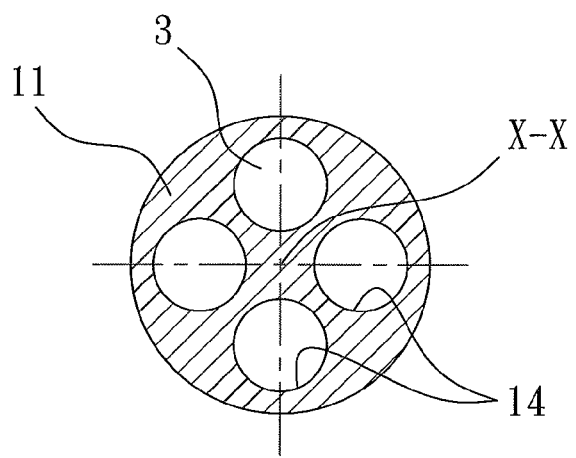
FIG. 4 is a cross sectional view taken along the lines 2-2 of FIG. 3.
Figure 5:
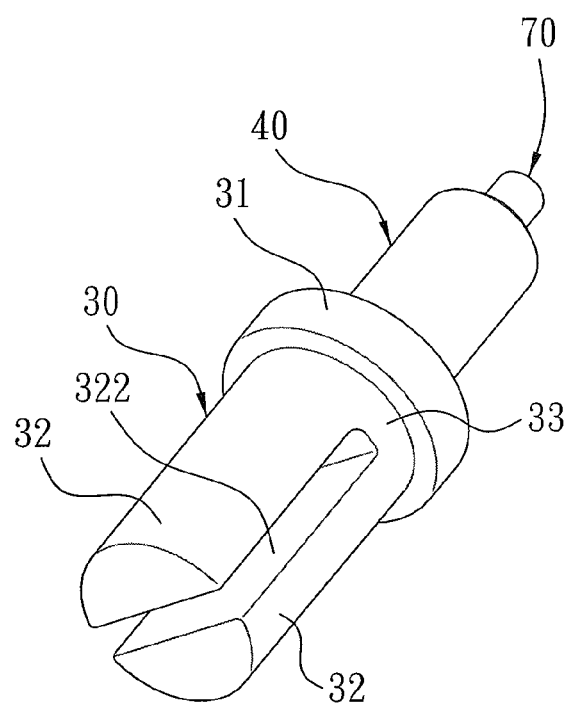
FIG. 5 is a perspective view showing the assembly of a thermostatic element according to a first embodiment of the present invention.
Figure 6:
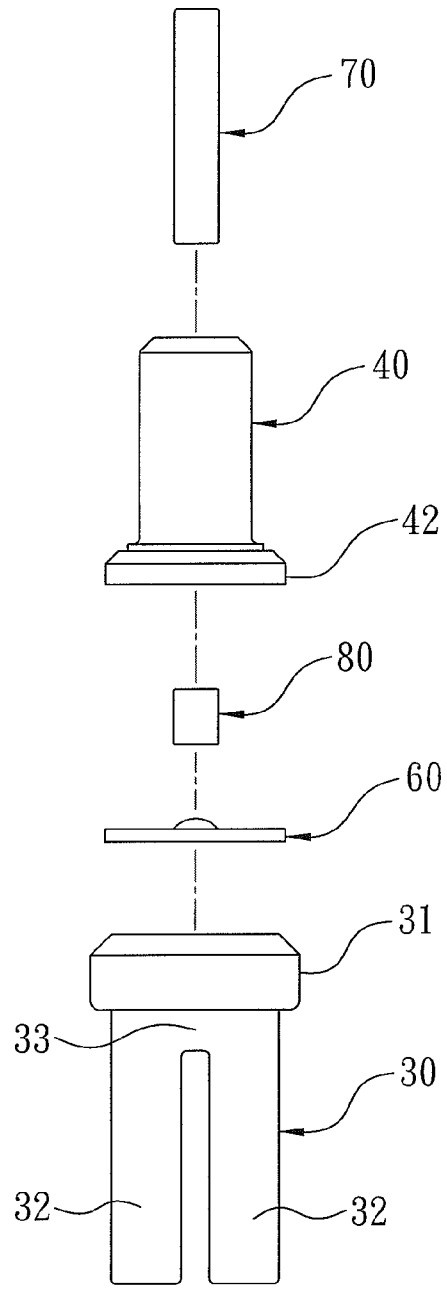
FIG. 6 is a plan view showing the exploded components of the thermostatic element according to the first embodiment of the present invention.
Figure 7:
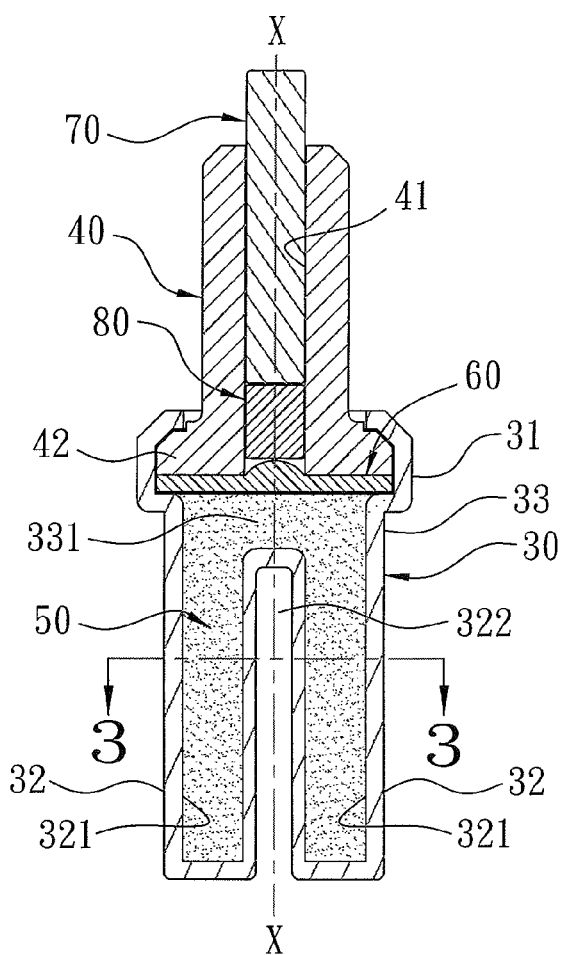
FIG. 7 is a cross sectional view showing the assembly of the thermostatic element according to the first embodiment of the present invention.
Figure 8:
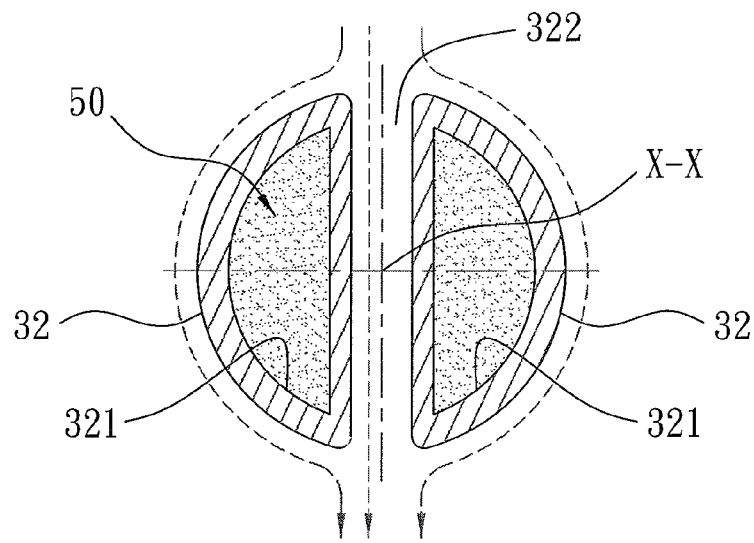
FIG. 8 is a cross sectional view taken along the lines 3-3 of FIG. 7.

It is to be noted that the thermostatic element of the present invention not only enables an external fluid to flow through an outer surface of the metal cover 30, as shown in FIG. 8, but also allows an external fluid to flow along the passage 322 of the two tubular legs 32 so as to obtain the following advantages:

1. The conventional thermostatic element has a filler 50 and a metal covers 30, both of which are at the same volume and length. Yet the metal cover 30 of the present invention has a larger contact surface for contacting with the fluid directly so as to enhance heat conducting efficiency, such that a reaction time of the piston 70 is shorten, i.e., a reaction time of the thermostatic element of the present invention is reduced. By an experiment, the heat conducting efficiency of the thermostatic element of the present invention is enhanced 2 to 2.7 times more than that of the conventional thermostatic element as shown in FIGS. 1 and 2. Likewise, the heat conducting efficiency of the thermostatic element of the present invention is enhanced 1.3 to 1.5 times more than that of the conventional thermostatic element as shown in FIGS. 3 and 4.
2. A largest distance between the two cavities 321 and a largest distance between any two particles of the filler 50 (such as paraffin wax) are reduced effectively or are maintained at a smaller value so as to enhance the heat conducting efficiency and to lower the reaction time of the thermostatic element of the present invention.
3. Since the heat conducting efficiency of the thermostatic element of the present invention is increased greatly, the filler 50 is fully selected from the thermal expansion material (such as paraffin wax) without adding any heat conduction material (such as copper powders) so as to lower material cost. In addition, performance differences of the conventional thermostatic elements are overcome after an uneven mixture occurs in a mixing process of the paraffin wax and copper powders, and a separated deposition of the copper powders is avoided, thus prolonging the service life of the thermostatic element of the present invention.

Figure 9:
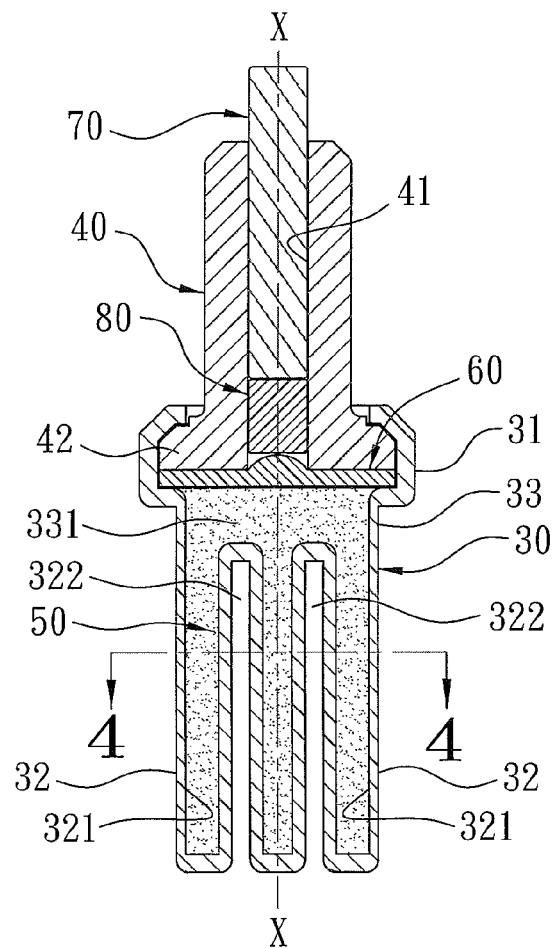
FIG. 9 is a cross sectional view showing the assembly of a thermostatic element according to a second embodiment of the present invention.
Figure 10:
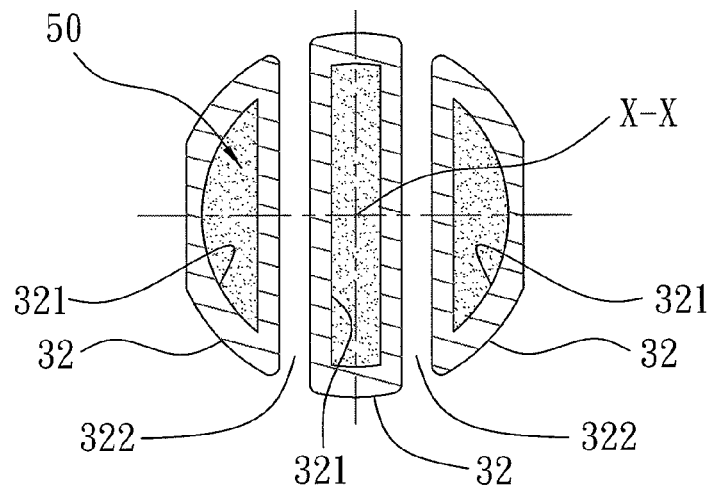
FIG. 10 is a cross sectional view taken along the lines 4-4 of FIG. 9.

Referring further to FIGS. 9 and 10, a difference of a thermostatic element of a second embodiment from that of the first embodiment of the present invention contains: three tubular legs 32 extend outward from the metal cover 30 in a linear arrangement, and among the three tubular legs 32 are defined two passages 322 separated from each other, wherein a width of each passage 322 is fixed. The external fluid flows along the two passages 322 and contacts with three outer surfaces of the three tubular legs 32 directly and conducts heat toward the filler 50 filled in three cavities 321 of the three tubular legs 32.

Figure 11:
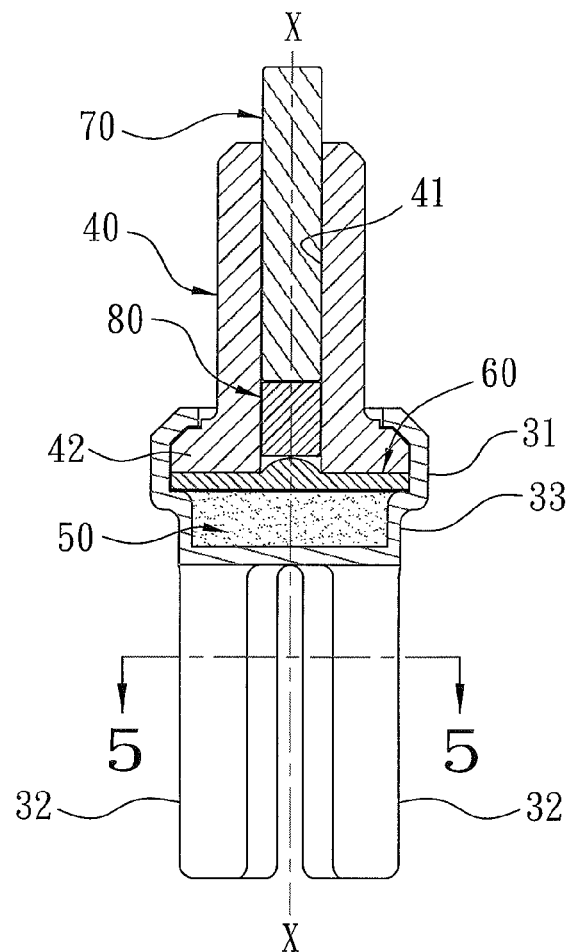
FIG. 11 is a cross sectional view showing the assembly of a thermostatic element according to a third embodiment of the present invention.
Figure 12:
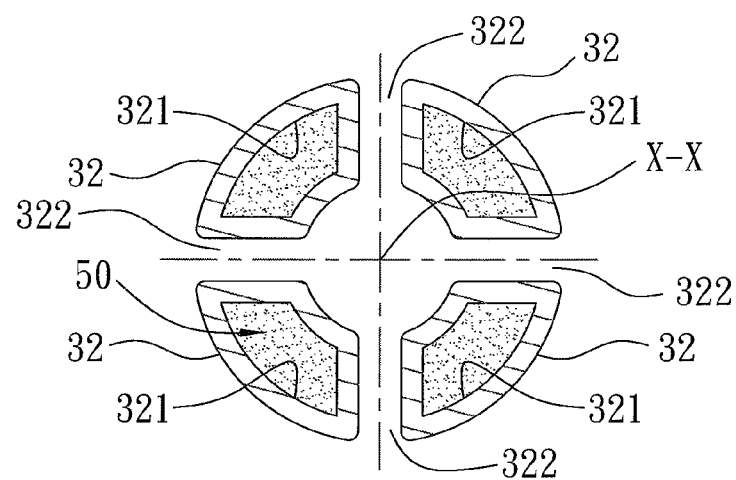
FIG. 12 is a cross sectional view taken along the lines 5-5 of FIG. 11.

As illustrated in to FIGS. 11 and 12, a difference of a thermostatic element of a third embodiment from that of the first embodiment of the present invention contains: four tubular legs 32 extend outward from the metal cover 30 in an isometric arrangement along a circumferential direction, and among the four tubular legs 32 are defined four passages 322 intersecting from each other, wherein a cross section of an intersection of the four passages 322 is circular. The external fluid flows along the four passages 322 and contacts with four outer surfaces of the four tubular legs 32 directly and conducts heat toward the filler 50 filled in the four cavities 321 of the four tubular legs 32.

Figure 13:
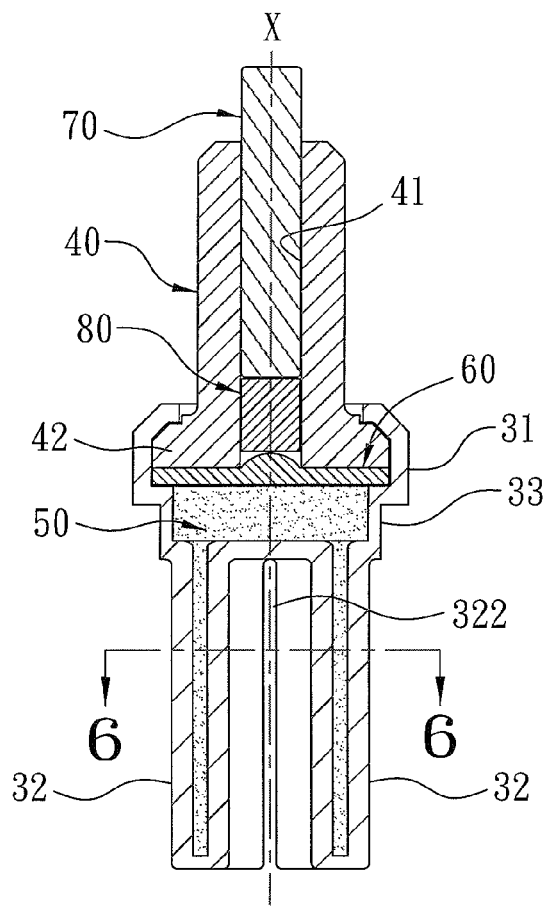
FIG. 13 is a cross sectional view showing the assembly of a thermostatic element according to a fourth embodiment of the present invention.
Figure 14:
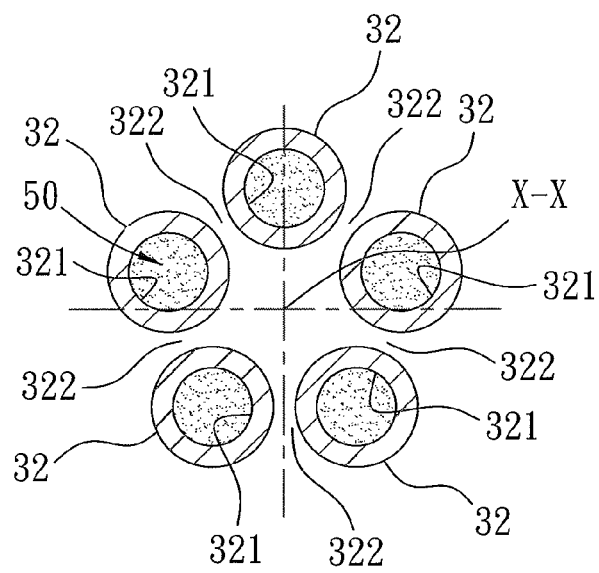
FIG. 14 is a cross sectional view taken along the lines 6-6 of FIG. 13.

As shown in to FIGS. 13 and 14, a difference of a thermostatic element of a fourth embodiment from that of the first embodiment of the present invention contains: five tubular legs 32 extend outward from the metal cover 30 in an isometric arrangement along a circumferential direction, so among the five tubular legs 32 are defined five passages 322 intersecting from each other, and a cross section of a cavity 321 of each tubular leg 32 is circular. The external fluid flows along the five passages 322 and contacts with five outer surfaces of the five tubular legs 32 directly and conducts heat toward the filler 50 filled in five cavities 321 of the five tubular legs 32.

Thereby, the thermostatic element of the present invention comprises at least two tubular legs 32 so as to form at least one passage 322 between the at least two tubular legs 32, such that the external fluid flows along the at least one passage 322 so as to conduct heat.

A shape of a cross section of the at least two tubular legs 32 and an arrangement between the at least two tubular legs 32 are not limited. Any design to enable the external fluid flowing along the at least one passage 322 is in the scope of the present invention. Thereby, the external fluid flows along the at least one passage 322 so as to conduct heat toward the filler 50 in at least two cavities 321 of the at least two tubular legs 32.

Preferably, a capacity of the at least two cavities 321 of the present invention to fill the filler 50 is 70% of a capacity of the metal cover 30 so that the filler 50 conducts heat when the external flows along the at least one passage 322 of the at least two tubular legs 32.

To flow the external fluid effectively, a width of the at least one passage 322 is limited. For example, the width of the at least one passage 322 is at least more than 0.5 m, such that a working process of the at least two tubular legs 32 is facilitated as well.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A thermostatic element comprising:
a metal cover for soaking in a fluid and having a covering head defined on a top end thereof;
a sleeve having a central channel and a seat located at a bottom end thereof; the seat being fixed in the covering head of the metal cover;
a filler filled in the metal cover and expanding and contracting based on a mixed temperature of cold water and hot water;
a partition disc disposed between the sleeve and the metal cover so as to separate the sleeve from the filler;
a piston secured in the central channel of the sleeve and coupling with the filler by ways of a central area of the partition disc, such that when the filler expands thermally or contracts, and the piston is driven by the central area of the partition disc to move in the central channel of the sleeve;
characterized in that:
the metal cover further has at least two tubular legs axially extending outward therefrom and a connecting portion defined between the covering head and the at least two tubular legs; each tubular leg has a cavity formed therein, and the connecting portion has a common room communicating with the cavity of each tubular leg, such that the filler is filled in the cavity of each tubular leg and the common room; between the at least two tubular legs is defined at least one passage for flowing the fluid.

2. The thermostatic element as claimed in claim 1, wherein a capacity of the at least two cavities to fill the filler is 70% of a capacity of the metal cover.

3. The thermostatic element as claimed in claim 1, wherein a smallest width of the at least one passage is at least more than 0.5 mm.

4. The thermostatic element as claimed in claim 1, wherein the at least two tubular legs of the metal cover are symmetrical to each other and have two cross sections formed in a half-moon shape, and a width of the at least one passage between the at least two tubular legs is fixed.

5. The thermostatic element as claimed in claim 1, wherein the metal cover has three tubular legs extending outward therefrom and arranged linearly, and among the three tubular legs are defined two passages separated from each other, wherein a width of each passage is fixed.

6. The thermostatic element as claimed in claim 1, wherein the metal cover has four tubular legs extending outward therefrom and arranged along a circumferential direction, wherein between any two adjacent tubular legs has a same distance, and among the four tubular legs are defined four passages intersecting from each other; a cross section of an intersection of the four passages is circular.

7. The thermostatic element as claimed in claim 1, wherein the metal cover has five tubular legs extending outward therefrom and arranged along a circumferential direction, wherein between any two adjacent tubular legs has a same distance, among the five tubular legs are defined five passages intersecting from each other, and a cross section of the cavity of each tubular leg is circular.

8. The thermostatic element as claimed in claim 1, wherein the filler is made of a thermal expansion material.

9. The thermostatic element as claimed in claim 8, wherein the thermal expansion material is paraffin wax.

10. The thermostatic element as claimed in claim 1, wherein the filler is made of a mixture of a thermal expansion material and thermal conduction powders.

11. The thermostatic element as claimed in claim 10, wherein the thermal expansion material is paraffin wax, and the thermal conduction powders are copper powders.

12. The thermostatic element as claimed in claim 1 further comprising a pad fixed in a section of the central channel between the piston and the partition disc so that the central area of the partition disc drives the piston via the pad.

13. The thermostatic element as claimed in claim 12, wherein the pad is made of a deformable elastomer.

* * * * *